United States Patent [19]
Olsen et al.

[11] Patent Number: 5,612,119
[45] Date of Patent: Mar. 18, 1997

[54] TRANSFER ARTICLE FOR FORMING RETROREFLECTIVE AND COLORED IMAGES AND METHOD OF MAKING SAME

[75] Inventors: Ulf N. Olsen, Solbergmoen, Norway; Erik Franke, Copenhagen, Denmark; Eilif Strand, Drammen, Norway

[73] Assignee: Minnesota Mining and Manufacturing Company, St. Paul, Minn.

[21] Appl. No.: 574,942

[22] Filed: Dec. 19, 1995

Related U.S. Application Data

[62] Division of Ser. No. 39,454, Jun. 23, 1993, Pat. No. 5,510,178.

[51] Int. Cl.$^6$ .............................. B32B 3/00; B32B 27/14
[52] U.S. Cl. ............................ 428/195; 428/72; 428/143; 428/323; 428/325; 428/327; 428/406; 428/407; 428/474.4; 428/478.8; 428/480; 428/913
[58] Field of Search .................. 422/212; 428/411.1, 428/195, 207, 913, 914, 206, 72, 143, 240, 261, 323, 325, 327, 406, 407, 474.4, 478.8, 480

[56] References Cited

U.S. PATENT DOCUMENTS

| | | | |
|---|---|---|---|
| 2,143,946 | 1/1939 | Hunter | 41/36 |
| 2,407,680 | 3/1945 | Palmquist et al. | 88/82 |
| 2,422,256 | 6/1947 | Phillippi | 40/135 |
| 2,543,800 | 3/1951 | Palmquist et al. | 88/82 |
| 2,555,715 | 6/1951 | Tatum | 88/82 |
| 2,567,233 | 9/1951 | Palmquist et al. | 88/82 |
| 2,592,882 | 4/1952 | Fisher et al. | 88/82 |
| 3,535,019 | 10/1970 | Longlet et al. | 350/105 |
| 3,551,025 | 12/1970 | Bingham et al. | 350/105 |
| 3,614,199 | 10/1971 | Altman | 350/105 |
| 3,700,305 | 10/1972 | Bingham | 350/105 |
| 3,758,192 | 9/1973 | Bingham | 350/105 |
| 3,836,227 | 9/1974 | Holmen et al. | 350/105 |
| 3,877,786 | 4/1975 | Borras et al. | 350/105 |
| 4,102,562 | 7/1978 | Harper et al. | 350/105 |
| 4,153,412 | 5/1979 | Bailey | 8/2.5 A |
| 4,234,643 | 11/1980 | Grotefend et al. | 428/200 |
| 4,546,042 | 10/1985 | Quon | 428/378 |
| 4,605,461 | 8/1986 | Ogi | 156/233 |
| 4,634,220 | 1/1987 | Hockert et al. | 350/167 |
| 4,656,072 | 4/1987 | Coburn, Jr. et al. | 428/40 |
| 4,721,649 | 1/1988 | Belisle et al. | 428/325 |
| 4,980,216 | 12/1990 | Rompp | 428/90 |

FOREIGN PATENT DOCUMENTS

| | | | |
|---|---|---|---|
| 153676 | 8/1988 | Denmark | B32B 27/04 |
| 155888 | 11/1988 | Denmark | D06Q 1/00 |
| 63-233107 | 9/1988 | Japan | E01F 9/00 |
| 64-38277 | 8/1989 | Japan | B41M 3/12 |
| 1303103 | 1/1973 | United Kingdom . | |
| WO79/01146 | 12/1979 | WIPO | B32B 27/40 |
| WO80/00462 | 3/1980 | WIPO . | |
| WO88/08793 | 11/1988 | WIPO . | |

OTHER PUBLICATIONS

Nylobarg NB One/Two–Pack Screen Inks product information.
Nylotex NX One/Two–Pack Screen Inks product information.

Primary Examiner—William Krynski
Attorney, Agent, or Firm—Gary L. Griswold; Walter N. Kirn; Karl G. Hanson

[57] ABSTRACT

A transfer for decorating surfaces comprises microspheres that are embedded about one-fourth to one-half the microsphere's diameter in a support sheet. The embedded portion of the microspheres have a reflective layer associated therewith to allow a retroreflective article that is stripped from the transfer to retroreflect light. One or more colored layers are printed imagewise one the microspheres. The color layers are prepared from a polyester resin and an isocyanate hardener. If more than one color layer is printed on the microspheres, then a two-component extender or a glue that contains a polyester is disposed on top of all the colored layers. An elastomer that contains a polyester or polyamide is then applied over either a single color layer or a multiple color layers and the extender layer or the polyester containing glue while either is still wet. The elastomer is fused into the single color layer or the extender layer or polyester containing glue and colored layers.

7 Claims, 1 Drawing Sheet

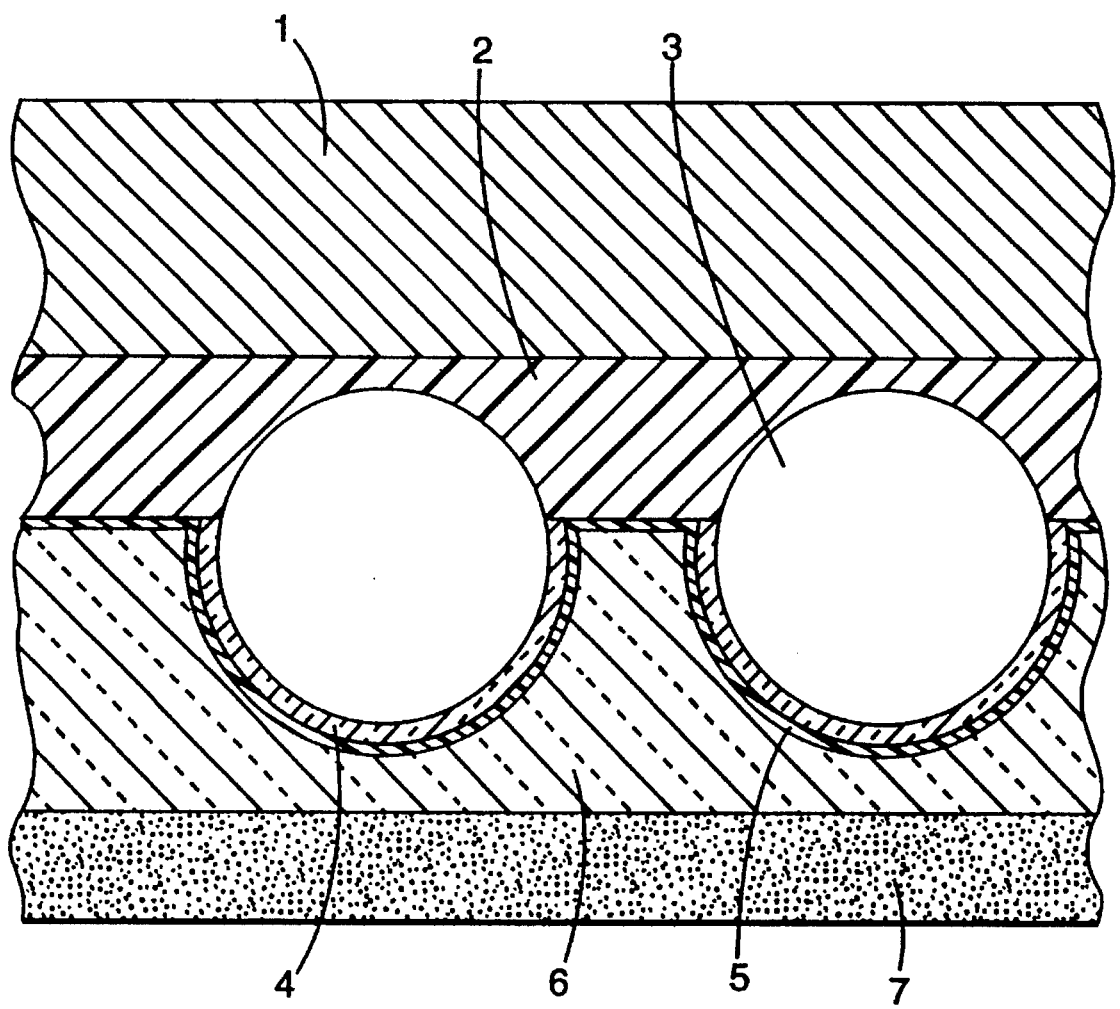

5,612,119

TRANSFER ARTICLE FOR FORMING RETROREFLECTIVE AND COLORED IMAGES AND METHOD OF MAKING SAME

This is a division of application Ser. No. 08/039,454 filed Jun. 23, 1993, now U.S. Pat. No. 5,510,178.

TECHNICAL FIELD

A transfer for decorating surfaces with images being extremely durable, in particular images comprising light-reflecting and coloured areas in arbitrary combination, and a process of making same

BACKGROUND

This invention concerns a transfer for decorating surfaces, preferably textiles or other flexible materials, with images being extremely durable and capable of standing both hot water wash and dry cleaning. In particular the invention concerns a transfer for decorating surfaces with images comprising light-reflecting areas of any configuration and colour in arbitrary combination with coloured non-reflecting areas. The invention also relates to a process of making such transfer.

It is known to decorate textiles by printing patterns in various colours by a suitable printing method, e.g. the silk screen process. For such patterns to be durable in use and to have good fastness to repeated washing, it is important that the inks used for the printing have good adhesion and cannot be peeled or picked off, that they are elastic so as to be capable of following the expansion and contraction of the substrate, and that they do not crackle or flake.

So-called plastisol inks have been developed for this purpose, based on elastomeric resins, often modified polyvinyl chloride (PVC), dissolved in high-boiling organic solvents. These plastisol inks, which are also called gum printing inks, can be given all possible shades by pigmentation.

It is also known to produce so-called transfers by means of these plastisol inks, i.e. by printing a given pattern in mirror-inverted fashion on a suitable substrate, preferably silicone or wax treated paper. The pattern may then be transferred by the user, e.g. a textile factory, from such a transfer to the textile by application of heat, i.e. the transfer is placed with the inked side against the textile and heated to 130° to 200° C., generally 160° to 180° C., under a pressure of 100 to 800 kPa, generally about 500 kPa, for 10 to 30 seconds, generally 15 to 20 seconds. The temperature, pressure and treatment time used depend, of course, upon the type and nature of the textile fabric and upon the plastisol type applied, but generally higher temperatures will involve treatment for a shorter period of time, and vice versa.

The international patent application published as WO 80/00462 describes a method of applying a metallised and/or pigmented decoration to a surface, for example a garment surface, comprising the steps of first providing a conventional ink transfer having the form of the intended decoration, and transferring the image therefrom to the surface in conventional manner by application of heat and pressure, and then superimposing a foil having a metallised and/or pigmented coating to the said image, subjecting the foil to heat and/or pressure to cause it to adhere to the image, and peeling off the foil thereby to provide a metallised or pigmented cover adhering to the image and being coextensive therewith. The metallised or pigmented coating on the foil may optionally be provided with a layer of heat or pressure sensitive adhesive on the face intended for application to the image, being so selected as to have an affinity for the material of the image and a disaffinity for the surface to which the image is applied. The metallised and/or pigmented coating may also include a cover layer on the face opposite the face intended for application to the image. But in any case this so-called "hot split" method only aims at applying a metallised and/or pigmented coating to the entire surface of an image being already transferred conventionally from a known transfer.

It is further known to produce so-called retro-reflecting films with a great light reflecting capacity for application on e.g. textiles, first and foremost for security reasons. These retro-reflecting films or reflex films come in two main types, one with a very large number of fine glass beads with a high refractive index embedded with a reflecting substrate in a base sheet (glass bead type), and another formed with a large number of prisms in a sheet. Both types may be formed with the glass beads or the prisms exposed in the surface (open type) or enclosed in a transparent layer (semi-open type) or coated with an optionally inked layer (closed type), or finally encapsulated in closed cavities with entrapped air (capsule type). The reflex films may be formed as reflex transfer films with a heat-activated adhesive intended for i.a. heat application to textiles. Reflex transfer films of the glass bead type may moreover be produced in a very elastic material, which makes them particularly suitable for application to flexible materials.

It is known from i.a. U.S. Pat. No. 3,836,227 to produce such a retro-reflecting film of the glass bead type by embedding a monolayer of glass microspheres having diameters between about 40 and 80 µm to a depth of about 40% of their diameter in a carrier sheet consisting of a polyethylene coating on a paper liner with heating of the polyethylene to about 140° C. A transparent specular coating of zinc sulfide having a thickness of one-quarter the wave length of white light is vapor-coated onto the exposed surfaces of the microspheres, whereafter the exposed glass microspheres are coated with an aqueous dispersion of a binder material comprising a thermoplastic heat-activatable adhesive copolymer of ethylene, vinyl-chloride and acryl amide and optionally a further thermoplastic heat-activatable adhesive copolymer of methyl methacrylate, ethyl acrylate and methacrylic acid in sufficient thickness to leave a dried layer which completely covers the microspheres. The layer is dried at 93° C. for 10 min. Optionally, a second layer comprising a thermoplastic heat-activatable adhesive copolymer based on acrylic acid and an acrylic acid ester may be applied. The resulting sheet material may be adhered onto a substrate, such as cardboard, by placing the exposed surface of the binder layer against the cardboard, and then passing the combination momentarily between hot lamination rolls heating the interface of the binder layer and cardboard to 120°–132° C. When the laminate has been cooled to room temperature the polyethylene-coated carrier sheet is stripped away.

It has been a significant drawback in the use of the known reflex transfer films that when applying the reflecting figures and signs, e.g. in the form of letters (words, messages) and logos it has been necessary to punch or cut out each individual letter/figure and apply them manually. Even though substantial funds have been invested in computer controlled cutting machines it has been necessary to remove the excess material around and in the letters manually, which is both labour demanding and entails heavy material loss. It is another drawback that previously it has only been possible to produce single-coloured lengths of reflex transfer films.

True, it is known to print a reflex transfer film with transparent colour over the glass bead surface to obtain various patterns and light effects, but this method does not either provide the possibility of producing individual letters/figures without the use of punching or cutting.

An attempt to remedy some of these drawbacks has been made in DK patent No. 155 888 B (and the corresponding international patent application published as WO 88/08793) according to which a special plastisol reflex transfer is prepared by a method in which a conventional plastisol transfer is coated with an elastomer granulate of a type (e.g. based on polyacryl amide) compatible with the plastisol ink and with the surface layer of a reflex transfer film, and the granulate is fused into the plastisol print by heating, following which a reflex transfer film cut to the contour of the pattern is positioned with the reflecting side inwards against the elastomer treated plastisol print and adhered to it by brief heating under a quite slight pressure. The thus formed plastisol reflex transfer may then be transferred to the desired substrate, in particular a textile, by conventional heat application. By this means it is possible to decorate textiles or other, preferably flexible, materials with patterns consisting of strongly light reflecting areas delimited by coloured areas without having to cut out each light reflecting detail separately. However, manual work is still demanded for punching or cutting out the more regular pieces of reflex transfer film which are coupled onto the conventional plastisol transfer, and the light reflecting details must at least partially be delimited by coloured areas.

U.S. Pat. No. 4,102,562 discloses a transfer sheet material for forming retro-reflective graphic images on a substrate, said sheet material comprising a support sheet, a dense continuous monolayer of transparent microspheres partially and removably embedded in the support sheet to a depth averaging between about one-quarter and one-half of their diameter, a specularly reflective layer covering the surfaces of the microspheres which are exposed above the support sheet, and a transfer layer printed over the layer of microspheres in an imagewise pattern, which leaves areas of the layer of microspheres without pattern, the transfer layer being of a thickness such as to embed within it the surfaces of the microspheres that are exposed above the support sheet in the printed areas, and the transfer layer being adhereable to a substrate while retaining its imagewise pattern so that when the transfer layer is adhered to the substrate and the support sheet is stripped away, the transfer layer is left in place on the substrate, with the microspheres pulled from the support sheet and partially embedded in the transfer layer to form an image which is retro-reflective over its full area. It is also stated that the transfer layer consists of a vinyl plastisol ink, and that the specularly reflective layer on the microspheres consists of a transparent dielectric mirror, but may also, if transparency is not necessary, consist of a vapor-coated metal, such as aluminium. It is further stated that a thin adhesion promoting layer comprising a polyurethane or a silane may be disposed between the specularly reflective layer and the transfer layer.

It has however been found that transfer layers of this kind, even when an adhesion promoting layer is applied between the specularly reflective layer and the transfer layer, do not ensure sufficient adhesion of the microspheres and do not adhere sufficiently to flexible substrates, such as textiles. Thus it is seen from example 1 of U.S. Pat. No. 4,102,562 that a reflecting image transferred onto garment from a transfer according to that patent specification lost 60% of its retro-flective intensity already after 5 washes in an automatic washer using hot water. Besides, images based on vinyl plastisol inks cannot stand dry cleaning. These drawbacks must be the reason why this kind of reflex transfer has not been put into practical use since it was invented in 1976.

SUMMARY OF THE INVENTION

According to the present invention we have found that is possible to produce a transfer for decorating all kinds of textiles with images being extremely durable and capable of standing hot water wash and dry cleaning, using two-component colours and extenders developed especially for printing on difficult materials such as nylon, polyester, polyalkenes and siliconised surfaces. Such two-component colours and extenders have never before been used for producing transfers, as after setting they are not heat-activatable and will normally adhere so strongly to the support sheet (usually silicone or wax treated paper or polyethylene foil) as to be incapable of letting go again. At the same time they generally have poor adhesion to ordinary textiles, such as cotton and the like. We have also found that it is possible instead of the above mentioned two-component extender to use a polyester-based glue.

In the broadest aspect the transfer according to the invention comprises a support sheet having printed imagewise thereon one or more layers of two-component colours based on polyester resin and an isocyanate hardener and, if there is more than one colour layer, on top thereof a layer of a corresponding two-component extender or a polyester-based glue, the colour layer or the extender and colour layers containing a polyester or polyamide based elastomer which has been applied to the colour or extender layer while it was still wet, and fused into the colour layer or the extender and colour layers.

According to the invention such a transfer is produced by a method comprising the following steps:

(a) on a support sheet one or more layers of two-component colour based on polyester resin and an isocyanate hardener are printed imagewise, (b) if more than one colour is printed, each colour layer is dried separately before the next layer is applied, and over all the layers a layer of a corresponding two-component extender or a polyester-based glue is printed, (c) while the single-colour layer or the extender layer is still wet, a powder of a polyester or polyamide based elastomer is applied, and the powder is fused into the colour layer or the extender and colour layers.

It is extremely surprising that by using an elastomer powder which is normally used to improve the adhesion to textiles of thermoplastic transfer colours, such as conventional plastisol colours, in this special way according to the invention it is possible to modify setting colour materials which have been developed for direct printing on difficult substrates so as to make them suited for transfers which can be heat-transferred to textiles in usual manner and provide extremely durable images. When printing a transfer it is also achieved that whereas by conventional transfer inks each colour layer had to be dried at 160°–180° C. for 15–25 seconds before application of the next layer, according to the present invention it suffices to dry each colour layer at 50°–60° C. for 15–25 seconds. Hereby any shrinkage or crumbling of the support sheet is avoided, enabling far more accurate and detailed printing.

According to this embodiment of the invention the support sheet is a conventional transfer carrier, e.g. a paper liner coated with wax or silicone or rapid-setting polyurethane.

A unique feature of the present invention thus comprises using as colour and transfer layer in the transfer two-component colours and corresponding extenders based on polyester and isocyanate hardener, which are normally used for printing on difficult substrates. Examples of two-component colours and extenders usable for producing the transfer according to the invention include the colour series "Visprox TCI 8700" and the transparent colour series "Visprox TCI 8790" with corresponding extender and hardener "TCI 8700 Hardener", which are produced by Visprox B.V., Haarlem, Holland, and the colour series "Nylobag NB" and "Nylotex NX" with corresponding extenders and hardener "NB Catalyst", which are produced by Sericol Group Limited, Westwood Road, Broadstairs, Kent CT10 2PA, England.

Another unique feature of the present invention is the use of a polyester or polyamide based elastomer powder which is applied to the still wet extender layer and fused into the extender and colour layer. The fusing may e.g. be achieved by means of infra-red heating to 130°–250° C. for 20–30 seconds. It has been found that the transfer based on two-component colours and extender without incorporation of this elastomer will soon loose its property for heat activation, but that the incorporation of the elastomer ensures the durability of the transfer, also by long-term storage. It has also been found that the elastomer significantly increases the adhesion between the transfer and textiles and simultaneously decreases the adhesion of the colour and extender layer to the support sheet, allowing the latter to be stripped off after the transfer of the image to the textile. Examples of elastomer powders usable for production of the transfer according to the invention include the polyamide resin powder "FT-409 Transfer Powder", which is produced by Sericol Group Limited, Westwood Road, Broadstairs, Kent CT10 2PA, England, and the polyester resin powder (polydiol dicarboxylate) "Avabond 48E Powder", which is produced by Imperial Chemical House, Millbank, London SW1P 3JF, England.

It has been found that it is possible instead of the layer of two-component extender in the transfers of this invention to use a layer of a polyester-based glue such as the one sold by Unitika Sparklite Co., Ltd., Japan, as a transfer glue designated "TR Glue". The raw materials for this glue are:
(A) Crystalline saturated polyethylene terephthalate resin in powder form Melting point: 110° C.

Brand name: "Vylon GN-915 P"

Manufacturer: Toyobo (B) Saturated polyethylene terephthalate resin in liquid

Composite: 50% saturated polyester resin in block

50% cyclohexanone (solvent)

Viscosity: 5000 centipoise at 20° C.

Brand name: "Vylon RV-51 CS"

Manufacturer: Toyobo

The transfer glue is prepared by adding A (25% by weight) to B (75% by weight) while stirring the glue, and the finished glue has a viscosity of 90 000 centipoise at 20° C. and a resin content of 62.5% by weight.

Such glues based on saturated polyester do not need a hardener for their function, but they take a somewhat longer time to dry than the two-component colours and extenders, for example 3–5 hours in a drying oven at 50°–60° C. or up to several days at room temperature. They can be used without having a polyester or polyamide based elastomer powder fused into the layer, if no special demands for durability and washability of the decorated textiles are to be met. However, if the transfers are to be used for work clothes and/or the textiles decorated therewith must endure washing at temperatures above 50° C., it is advisable to cover the glue layer with an elastomer powder which is fused into the layer as described above.

According to the invention it has also been found that the said two-component colours and extenders in connection with the special treatment according to the invention are usable as transfer layer in reflecting transfers and provide solid anchoring of the reflecting glass beads in the layer and a firm adhesion to the substrate onto which the layer is transferred, so that the image transferred stands both wash and dry cleaning. Here, too, a polyester-based glue may be used instead of the two-component extender. In this connection it has also been found possible by use of a release agent in a simple printing process to achieve that the produced transfer comprises both reflecting and non-reflecting areas.

According to the invention it is thus possible by simple graphic processes to produce transfers for decoration of textiles with images comprising light reflecting areas of arbitrary configuration and colour and in arbitrary combination with coloured non-reflecting areas, said images being durable and preserving their reflective intensity both in wash and dry cleaning.

This is achieved by the transfer according to the invention which comprises (a) a support sheet with a monolayer of transparent microspheres being partially embedded in the support sheet to a depth of between about one-quarter and one-half of their diameter, (b) a specularly reflecting layer covering such parts of the surfaces of the microspheres as are exposed above the support sheet, (c) optionally a coating of a release agent printed imagewise on top of the layer of microspheres at places where a non-reflecting image is desired, (d) one or more coatings of two-component colours based on polyester resin and isocyanate hardener as well as various pigments printed imagewise on top of the layer of microspheres and release agent, if any, (e) a transfer layer of an extender corresponding to the two-component colours, but without pigment, or of a polyester-based glue printed imagewise on top of the layer of microspheres and colour in such thickness that the exposed parts of the glass beads above the support sheet are completely embedded therein, (f) the extender and colour layers containing a polyester or polyamide based elastomer which has been applied while the extender layer was still wet, and fused into the extender and colour layers.

The method according to the invention for producing such a transfer comprises the following steps:

(a) a support sheet with a monolayer of transparent microspheres being partially embedded in the support sheet to a depth of between about one-quarter and one-half of their diameter, is coated with a specularly reflecting layer covering the surfaces of the microspheres that are exposed above the support sheet, (b) if parts of the transferred image are not to be reflecting, a coating of a release agent is printed imagewise on top of the corresponding parts of the layer of microspheres, (c) one or more coatings of two-component colours based on polyester resin and an isocyanate hardener as well as various pigments are printed imagewise pattern on the layer of microspheres and optionally release agent, and each colour coating is dried, (d) a transfer layer of an extender corresponding to the two-component colours, but without pigment, or of a polyester-based glue is printed on the layer of microspheres and colour in such thickness that the exposed parts of the glass beads above the support sheet are completely embedded therein, (e) while still wet the extender layer is coated with a powder of a polyester or polyamide based elastomer, and the powder is fused into the extender and colour layers.

BRIEF DESCRIPTION OF THE DRAWING

FIG. 1 is a cross-section of a transfer article in accordance with the present invention.

DETAILED DESCRIPTION OF THE INVENTION

The support sheet with a monolayer of transparent microspheres used in the present embodiment of the invention may be a glass bead release sheet of the kind produced in the first step of the production process of the known reflex transfer foils of the glass bead type. The carrier may e.g. by a paper liner or a polyester foil provided with a coating of thermoplastic material, e.g. polyethylene, being sufficiently thick to be capable of embedding the glass beads to a depth averaging between one-quarter and one-half of their diameter. Advantageously, the thermoplastic material is coated with an agent, such as silicone, which controls the adhesion of the glass beads to the material. Then a monolayer of glass beads is applied by heating of the support sheet to soften the thermoplastic material so as to ensure embedding of the beads therein.

The specularly reflecting layer which is applied to the exposed parts of the glass beads may in known manner consist of a transparent dielectric mirror or, if transparency is not needed, metal, such as aluminium. If the reflective intensity is of no decisive importance the glass beads do not need to form a dense continuous layer, but may be applied to the support sheet in reduced density, so that the colour or colours in the finished image are visible between the beads, even if the beads are coated with aluminium.

A special feature of the present invention is the optional application of a coating of a release agent on parts of the layer of glass beads before the application of the colour and extender layer. This release agent must be of such nature that the glass beads applied thereto let go more easily of the colour and extender layer than of the support sheet with optionally applied silicone coating. Hereby it is achieved that when the transfer-image has been transferred to a substrate by heat activation the glass beads when peeling off the support sheet will remain adhered in the colour and extender layer except in such areas where they have been coated with a release agent. The release agent may e.g. be a silicone or a fast setting polyurethane. A suitable release agent is a silicone of the type "Dispersion CAS 4A' 75%" sold by Rhone Poulenc.

One of the significant advantages of this embodiment of the invention is that it is possible by imagewise printing with release agent to decide which parts of the transfer pattern must be reflecting and then by imagewise printing with several colours of the above stated kind in each separate printing process to form a multicolour transfer pattern. After each of these printing processes the applied coating is dried in air at from room temperature up to max. about 60° C. for from 5 min to 10 seconds, preferably 50°–60° C. for 15–25 seconds. By another imagewise printing process the colour coatings and any further areas which it is desired should be colourlessly reflecting are coated with a layer of extender, and while this layer is still wet it is covered by an elastomer powder of the previously stated kind, and the powder is fused into the extender and colour layers by heating to 130°–250° C. for 10–40 seconds, preferably to about 180° C. for about 20 seconds. Thus, merely by repeating simple graphic printing processes it is possible to produce transfers with which, by conventional application of heat, a multicoloured image having reflecting and non-reflecting areas in any desired configuration may be transferred.

If, however, an image having only one colour is desired the extender or glue layer may optionally be left out and the colour be used also as binder and transfer layer, the colour being applied in a sufficiently thick layer for the exposed parts of the glass beads above the support layer to be completely embedded therein, and, while the colour layer is still wet, applying the elastomer powder and fusing it into the colour layer as stated above.

On the other hand, it is also possible to leave out the colour coatings and the optional coating of release agent printing the layer of two-component extender or polyester-based glue imagewise directly on the layer of microspheres so that the transfer image only comprises uncoloured reflecting areas.

Instead of using the usual printing processes, e.g. silk screen printing, it is also possible to use a colour copier with two-component toner for applying the colour coatings. When using several colours all the colours can thus be applied in one working operation. In any event the colour coating must subsequently be covered with a layer of colourless two-component extender which while still wet is covered with an elastomer powder of the previously stated kind, which is fused into the layer. A suitable colour copier could e.g. be "Canon Color Laser Copier 500" which operates with indirect electrostatic copying in full colour or single colour generated by toner projection with two-component toners in the colours yellow, magenta, cyan and black or one of these and with fixation by passage of hot rollers. This laser colour copier is produced by Canon Inc., 2-7-1 Nishi-Shinjuku, Shinjuku-ku, Tokyo 163, Japan.

Transfers according to the invention may advantageously be produced in large scale on so-called roll to roll transfer machines.

Such machines normally operate with a silicone paper provided in large rolls with a width of as much as 90 cm. The paper passes continuously from one silk screen printing machine with subsequent drying oven to another. Thus, if four stations are available 4-coloured transfers may be produced. The transfer is cut from the finished roll.

In the reflex-transfer embodiment the reflex-liner in the roll format is used as support, and the last printing station is used for printing the extender layer, which subsequently in a wet state passes through a powder application unit which applies the elastomer powder. Fusing is subsequently performed in an infra-red drying oven. Times and temperatures are as in normal transfer production.

It is also possible to transfer the transfer pattern continuously from a thus produced transfer roll to lengths of textile. Use can be made of known technology from the so-called sublistatic method in which patterns are transferred in a continuous calander-process from a coloured paper to lengths of textile by means of heat and pressure in a continuous process. The transfer machine can be adjusted with temperature, pressure, time corresponding to the normal application conditions for transfers of the present type.

Hereby it is possible to produce reflecting patterns which could not be obtained rationally by separate applications of reflex transfers. Consequently new design possibilities may be offered to the clothing industry.

EXAMPLE

The support sheet used was a sheet material produced as described in U.S. Pat. No. 4,102,562, column 3, line 33–53 and comprising the parts 1, 2, 3 and 4 shown in the attached drawing. The sheet material comprises a Kraft-paper base sheet 1 covered with a thermoplastic layer 2 of low-density polyethylene, in which transparent glass microspheres 3 have been embedded by heating, the microspheres having a refractive index of approx. 1.92 and diameters in the range of 70–100 µm. On the parts of the microspheres 3 which are not embedded in the polyethylene layer 2, they are provided with a transparent dielectric mirror 4 consisting of a vapour-coated layer of cryolite and on top of this layer a vapour-coated layer of zinc sulfide, each layer having an optical thickness (the product of physical thickness and refractive index) of one-quarter the wave length of white light, i.e. approx. 140 nm.

In a silk screen printing machine the following layers are printed in an imagewise inverted fashion on this support sheet:

1. On such areas of the support sheet intended to give a non-reflecting transfer-image is printed a clear varnish layer consisting of rapid-setting polyurethane, and this layer is dried in an infra-red jet-drying oven at approx. 60° C. for 60 seconds, whereafter the polyurethane is no longer heat-activatable, but forms a solid bond with the support sheet and binds the glass beads thereto. Simultaneously the varnish layer has a hard and smooth surface which does not react with the subsequent two-component colours and extender, and it consequently acts as a release layer towards these layers.

2. On top of the glass beads and the release layer the desired colour layers, denoted by 5 in the drawing, are then, each in a separate working operation, printed with two-component colours selected from the colour series "Nylotex NX" admixed with 1–5% (v/v) hardener "NB Catalyst" produced by Sericol Group Limited. After each printing the colour layer is dried in an infra-red jet-drying oven at approx. 60° C. for approx. 20 seconds.

3. Over all these colour layers and optionally beyond them, if the transfer image is also to comprise uncoloured reflecting areas, is printed a layer of "Nylotex NX" extender base, corresponding to the colours, but being without pigmentation and consequently transparent, in a thickness which completely embeds the exposed parts of the glass beads (40–75 µm after drying) denoted by 6 in the drawing.

4. While the extender layer is, still wet it is covered with a powder of a polydiole dicarboxylate elastomer, "Avabond 48E Powder", produced by Imperial Chemical House, denoted by 7 in the drawing. The powder sinks into the extender layer and by immediately succeeding heating in an infra-red oven at 180° C. for 20 seconds the elastomer powder is fused with the extender and colour layers. The result is a finished transfer according to the invention.

5. The transfer image is transfered to a textile of polyester/cotton-mixture by positioning the transfer with the powder treated extender layer against the textile and introducing the combination in a heat press exerting a pressure of 310 kPa at a temperature of 160° C. for 12 seconds. After cooling the support sheet is peeled off whereby the glass microspheres remain on the pattern transferred where they are anchored in the colour and extender layers, whereas they adhere to the support sheet at such places where a release layer has been interposed and on the excess part around the transfer pattern.

The transferred image shows a design consisting of non-reflecting areas in the desired colours and also reflecting areas where the glass microspheres provide a strong retro-reflex in darkness, but in daylight permit the light to shine through and reproduce the underlying colours with a glittering glow. The image adheres extremely well to the textile and endures both hot water wash (95° C.) and dry cleaning with dichloroethylene and similar agents.

What is claimed is:

1. A transfer for decorating surfaces, which comprises a support sheet having microspheres that have a first portion embedded about one-fourth to one-half the microsphere's diameter in the support sheet and a reflective layer associated with a second portion of the microspheres, the second portion of the microspheres having printed imagewise thereon one or more coloured layers prepared from a polyester resin and an isocyanate hardener and, if there is more than one coloured layer, on top of all the coloured layers and microspheres, there is disposed a corresponding two-component extender or a glue that contains a polyester, the single colour layer or the extender or polyester glue and the multiple coloured layers containing an elastomer that contains a polyester or polyamide and that has been applied to the single coloured layer or the extender layer or the polyester containing glue while either was still wet, and fused into the single coloured layer or the extender layer or the polyester containing glue and the multiple coloured layers.

2. A transfer according to claim 1, wherein the support sheet comprises a polyethylene coated paper liner, optionally treated with a silicone release agent or rapid-setting polyurethane.

3. A transfer for decorating surfaces with images comprising light-reflecting areas of any configuration and colour in arbitrary combination with coloured, non-reflecting areas, which comprises:

(a) a support sheet having a monolayer of transparent microspheres embedded about one-fourth to one-half the microsphere's diameter in the support sheet, (b) a specularly reflecting layer coveting parts of the surfaces of the microspheres that are exposed above the support sheet, (c) optionally a coating of a release agent printed imagewise on top of the layer of microspheres at places where a non-reflecting image is desired, (d) one or more coloured coatings prepared from a polyester resin and isocyanate hardener and containing pigments, the coloured coatings being printed imagewise on top of the layer of microspheres and optional release agent, (e) an optional transfer layer of an extender corresponding to the coloured layer(s), but without pigment, or of a glue containing polyester printed imagewise on top of the layer of microspheres and coloured layer in such thickness that the exposed parts of the microspheres above the support sheet are completely embedded therein, (f) the coloured layers and optional transfer layers containing an elastomer that has been applied while the extender layer or polyester-containing glue was still wet, and fused into the extender or glue and coloured layers.

4. A transfer according to claim 3, wherein the support sheet comprises a paper liner or a polyester sheet having a coating of a thermoplastic material, in which the microspheres are embedded to a depth averaging between one-quarter and one-half their diameter.

5. A transfer according to claim 3, wherein a coating of an agent, which controls the adhesion of the microspheres to the support material, is provided between the support sheet and the microspheres.

6. A transfer according to claim 3, wherein in such areas of the transfer where a non-reflecting image is desired, a release agent, is positioned between the microspheres and the coatings of colour and extender.

7. A transfer according to claim 3, wherein by having instead of the more than one coloured layers and the optional transfer layer only one single colour layer, which is sufficiently thick to completely embed therein the exposed parts of the microspheres above the support sheet, and comprises an elastomer that contains polyester or polyamide and that has been applied while the colour layer was still wet, and fused into the colour layer.

* * * * *